Sept. 20, 1932.                N. E. BRIDGMAN                1,878,814
                                   FEEDER
                            Filed Aug. 16, 1929
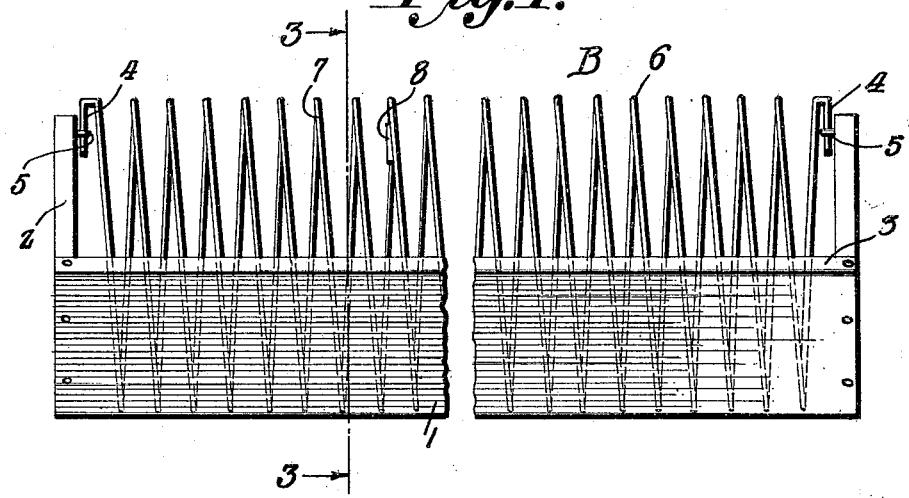
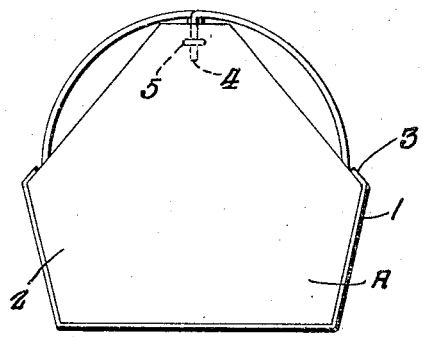
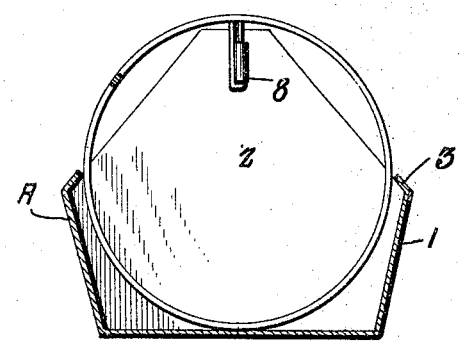
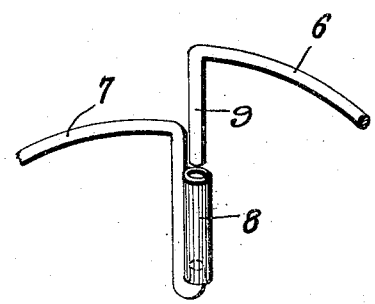
N. E. Bridgman,
INVENTOR
BY Victor J. Evans
ATTORNEY Patented Sept. 20, 1932

1,878,814

UNITED STATES PATENT OFFICE

NEIL E. BRIDGMAN, OF SUNNYSIDE, WASHINGTON

FEEDER

Application filed August 16, 1929. Serial No. 386,296.

This invention relates to a feeder or trough for poultry, the general object of the invention being to provide a trough having flanges at its sides for preventing the material within the trough from being worked out of the trough by the poultry and to provide a coil within the trough and projecting therefrom, which prevents the poultry from getting into the trough and from roosting thereon, so that the trough and the feed therein is kept clean and in a sanitary condition.

Another object of the invention is to form the coil in two sections so that one section can be removed and the other lengthened so that the spaces between the convolutions of the coil remaining in the trough will be increased in size and thus permit the poultry, as they grow larger, to have access to the feed in the trough.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is an elevation of the invention.

Figure 2 is an end view thereof.

Figure 3 is a section on line 3—3 of Figure 1.

Figure 4 is a detail view showing how the two sections of the coil are connected together.

In these views, A indicates the trough which is formed with diverging sides 1 and with the ends 2 extending well above the sides. The upper edges of the sides are bent inwardly, as shown at 3, to form flanges which act to prevent the poultry from pulling the feed out of the trough. A coil B is placed in the trough and extends well above the same, with depending portions 4 at the ends of the coil which are adapted to engage the eyelets 5 carried by the upper portions of the ends 2. Thus the coil is removably held in the trough so that it can be easily and quickly removed when feed is to be placed therein and this arrangement of parts will hold the coil in slightly expanded position so that young poultry can place their heads through the spaces between the convolutions of the coil and thus reach the feed within the trough. The coil is formed of two sections 6 and 7 and the inner end of one section carries a socket member 8 for receiving a straight part 9 at the inner end of the other section so that the two sections are detachably connected together when the part 9 is placed in the part 8. By virtue of this arrangement, it is manifest that when the poultry reach a size that their heads are too large to enter the spaces between the convolutions the section 7 may be removed and the section 6 stretched, with its end parts 4 and 9 placed in the eyelets 5, thereby increasing the width of the spaces between the convolutions and permitting larger size poultry to eat from the trough. The coil will prevent the poultry from getting in the trough and scratching the feed therefrom and it will also prevent the poultry from roosting on the trough and soiling the trough and the feed therein. Thus I have provided a simple and inexpensive trough which acts to prevent waste of feed and the spread of diseases.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A feeder of the class described comprising a trough having extensions on its ends, with its sides diverging and formed with inwardly extending flanges at their upper edges, eyelets carried by the upper ends of the extensions, a coil having straight portions at its ends engaging the eyelets whereby the coil is held in the trough in expanded position, with portions of the coil extending above the trough, said coil being formed of two sections, a socket member on the inner end of one section and a straight portion on the inner end of the other section for engaging the socket member, this straight portion engaging an eyelet when the other section is removed whereby the single section will be held in expanded position, with large spaces between its convolutions.

2. A feeder of the class described comprising a trough having end walls, a coil arranged in the trough and extending above the latter, said coil including two sections detachably connected together in end to end relation, and means carried by the end walls of the trough for engaging the outer convolutions of the connected sections or the opposed end convolutions of either separate section of the coil to hold the same in expanded position in the trough.

3. A feeder of the class described comprising a trough having end walls, a coil arranged within the trough and extending above the latter, said coil being formed of two sections arranged in end to end relation, a socket member carried by the innermost convolution of one section, a straight part formed on the adjacent convolution of the other section for engaging the socket and holding the sections detachably connected together, and means carried by the end walls to engage the outermost convolutions of the coil as a unit, or the inner and outermost coil of one section when the other section is removed, to hold the same in expanded position.

In testimony whereof I affix my signature.

NEIL E. BRIDGMAN.